March 22, 1966 I. S. WESTERBACK 3,242,493
RUNWAY DEFINING APPARATUS
Filed Nov. 29, 1962 8 Sheets-Sheet 1

INVENTOR.
IVAR S. WESTERBACK
BY
S. C. Yeaton
ATTORNEY

INVENTOR.
IVAR S. WESTERBACK
BY
S. C. Yeaton
ATTORNEY

WHERE: $T = \tan^{-1} \dfrac{A + \dfrac{\Delta A}{2}}{B + \dfrac{\Delta \gamma}{2}}$ $$\rho = \tan^{-1} \frac{(A + \Delta H) - \left(\Delta H + \dfrac{\Delta A}{2}\right)}{B - \dfrac{\Delta \gamma}{2}}$$

INVENTOR.
IVAR S. WESTERBACK
BY
S. C. Yeaton
ATTORNEY

INVENTOR.
IVAR S. WESTERBACK
BY
[signature]
ATTORNEY

March 22, 1966 I. S. WESTERBACK 3,242,493

RUNWAY DEFINING APPARATUS

Filed Nov. 29, 1962 8 Sheets-Sheet 5

INVENTOR.
IVAR S. WESTERBACK
BY S. C. Yeaton
ATTORNEY

INVENTOR.
IVAR S. WESTERBACK
BY
S.C. Yeaton
ATTORNEY

INVENTOR.
IVAR S. WESTERBACK
BY
S. C. Yeaton
ATTORNEY

INVENTOR.
IVAR S. WESTERBACK
BY
S. C. Yeaton
ATTORNEY

United States Patent Office 3,242,493
Patented Mar. 22, 1966

3,242,493
RUNWAY DEFINING APPARATUS
Ivar S. Westerback, Glenhead, N.Y., assignor to Sperry Rand Corporation, Great Neck, N.Y., a corporation of Delaware
Filed Nov. 29, 1962, Ser. No. 240,836
18 Claims. (Cl. 343—108)

Figure 1A:
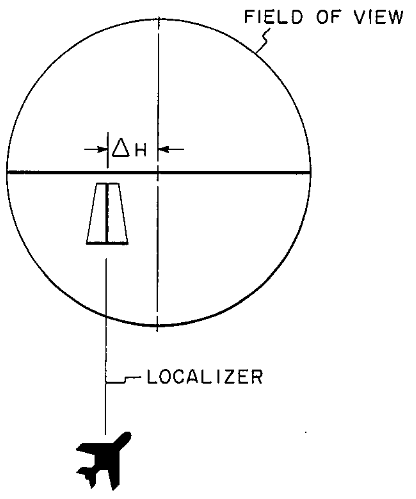

This invention relates to flight control apparatus and in particular provides a locally generated four-sided configuration that is (in size, shape, and location in a field of view) continually and substantially equivalent to the four-sided image that a pilot would see of an actual, i.e., real world, runway while landing his aircraft.

In providing such a quadrangular configuration, techniques described in copending U.S. application S.N. 164,769, which is assigned to the instant assignee and was co-invented by the inventor herein, are employed. That is, the present invention produces a "local" runway configuration by employing signals provided by the instrument landing system, such system comprising, as is known, glide slope and localizer sections: the glide slope section of the instrument landing system produces a signal E representative of the angular displacement of the craft from a radio defined course intersecting the earth at a point (the touchdown point) at the runway threshold, i.e., the start of the runway which is actually used for landing purposes; the localizer section of the instrument landing system produces a signal D proportional to the angular displacement (measured from the far end of the runway) of the craft from a line that is a continuation of the runway center line.

As described, the invention provides a four-sided runway figure on a cathode ray tube, from which projections to reflex sighting apparatus (like the apparatus described in application S.N. 164,769) may be made. The facial area of the tube in this case would be represesntative of the field of view within which the runway figure would be continually positioned. Though described in cooperation with cathode ray tube apparatus, it is to be realized that the invention is not so limited, but may be practiced in a variety of ways, e.g. in creating a runway-shaped opening in a shutter the elements of which move with respect to each other to provide variable lengths of, and relative angles between, adjacent "runway" sides.

To provide the invention, use is made of a "descriptive geometry" technique which, in combination with a pictorial presentation (plan and profile) of a hypothetical landing situation, results in the determination of variables necessary for the "local" generation of the continually changing quadrangular runway figure. This will be described in detail later.

Throughout the specification, devices for performing mathematical operations are called for; these devices may take various forms and, for typical (electrical) devices useful with the invention, reference should be had to Massachusetts Institute of Technology, Radiation Laboratory Series, volume 19, McGraw-Hill Book Company, Inc., New York, chapters 18 and 19.

A principal object of the invention is to provide apparatus useful in aiding the pilot of an aircraft during a landing maneuver.

Another object of the invention is to provide apparatus that produces a four-sided configuration dimensionally similar to the image of a runway seen during a landing maneuver.

Another object of the invention is to provide apparatus useful in generating a four-sided configuration having side lengths and relative angles between adjacent sides representative respectively of the sides and angles of the runway image seen by the pilot during a landing maneuver, such apparatus producing the four-sided configuration from data signals provided by the instrument landing system.

Figure 1B:
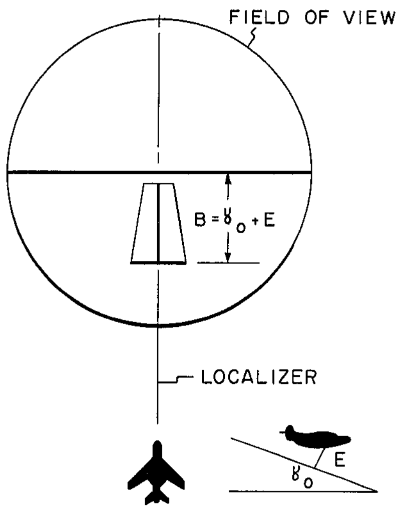
Figure 2A:
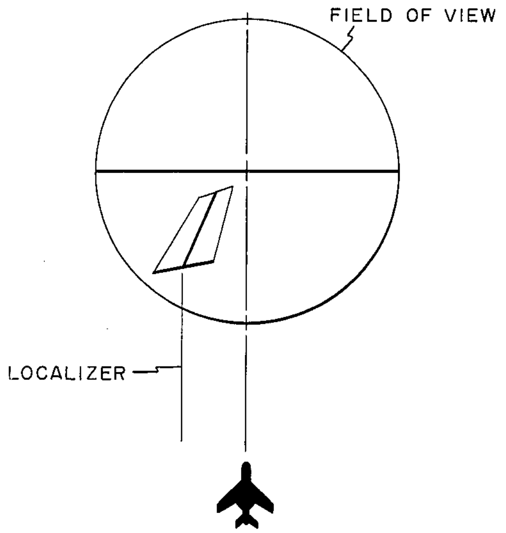
Figure 2B:
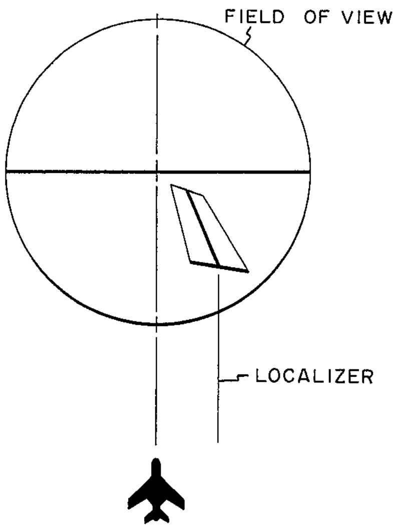
Figure 3A:
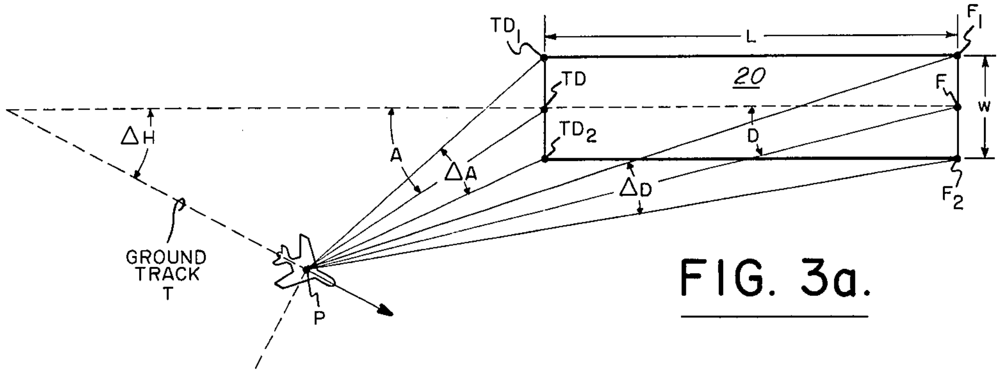
Figures 3B, 3C:
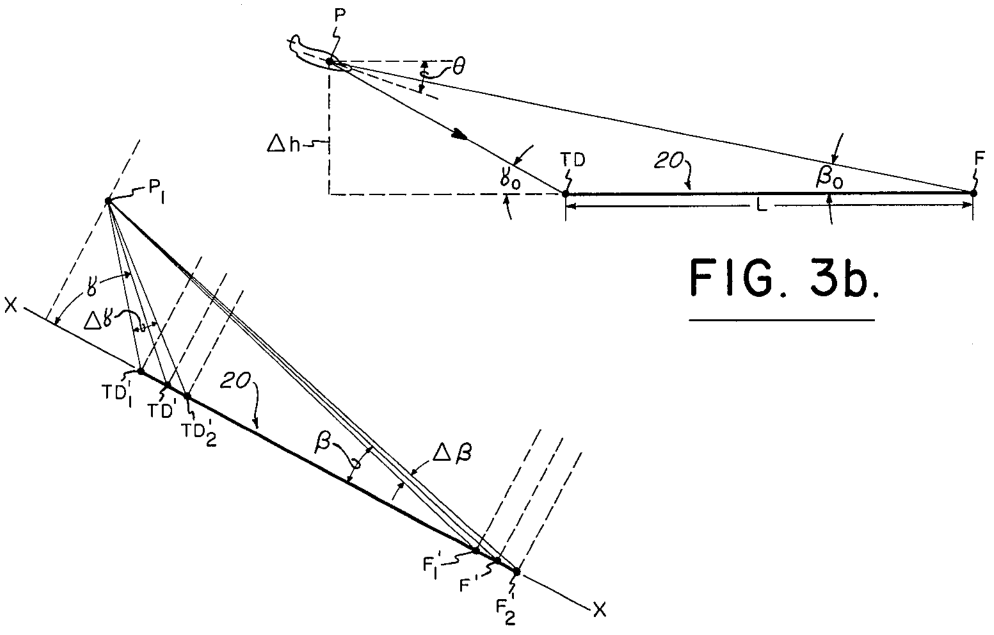
Figure 4:
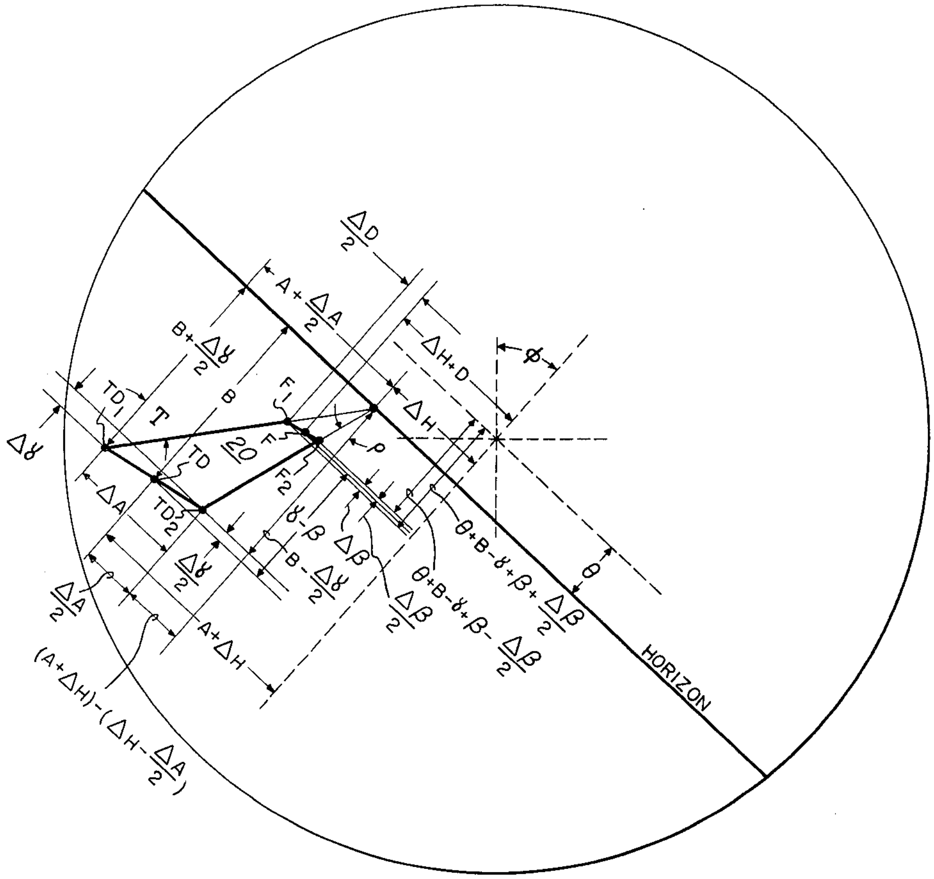
Figure 5A:
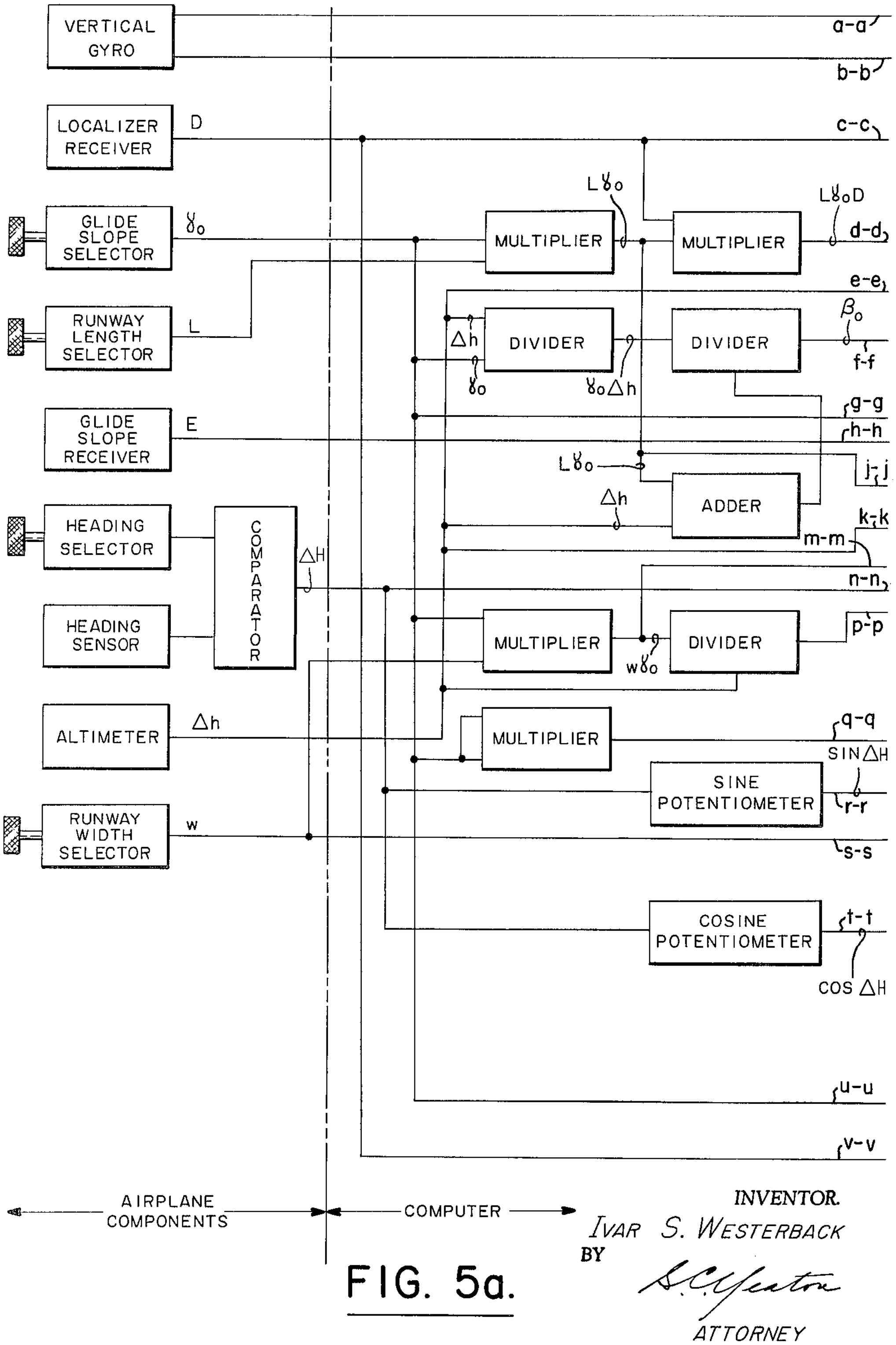
Figure 5B:
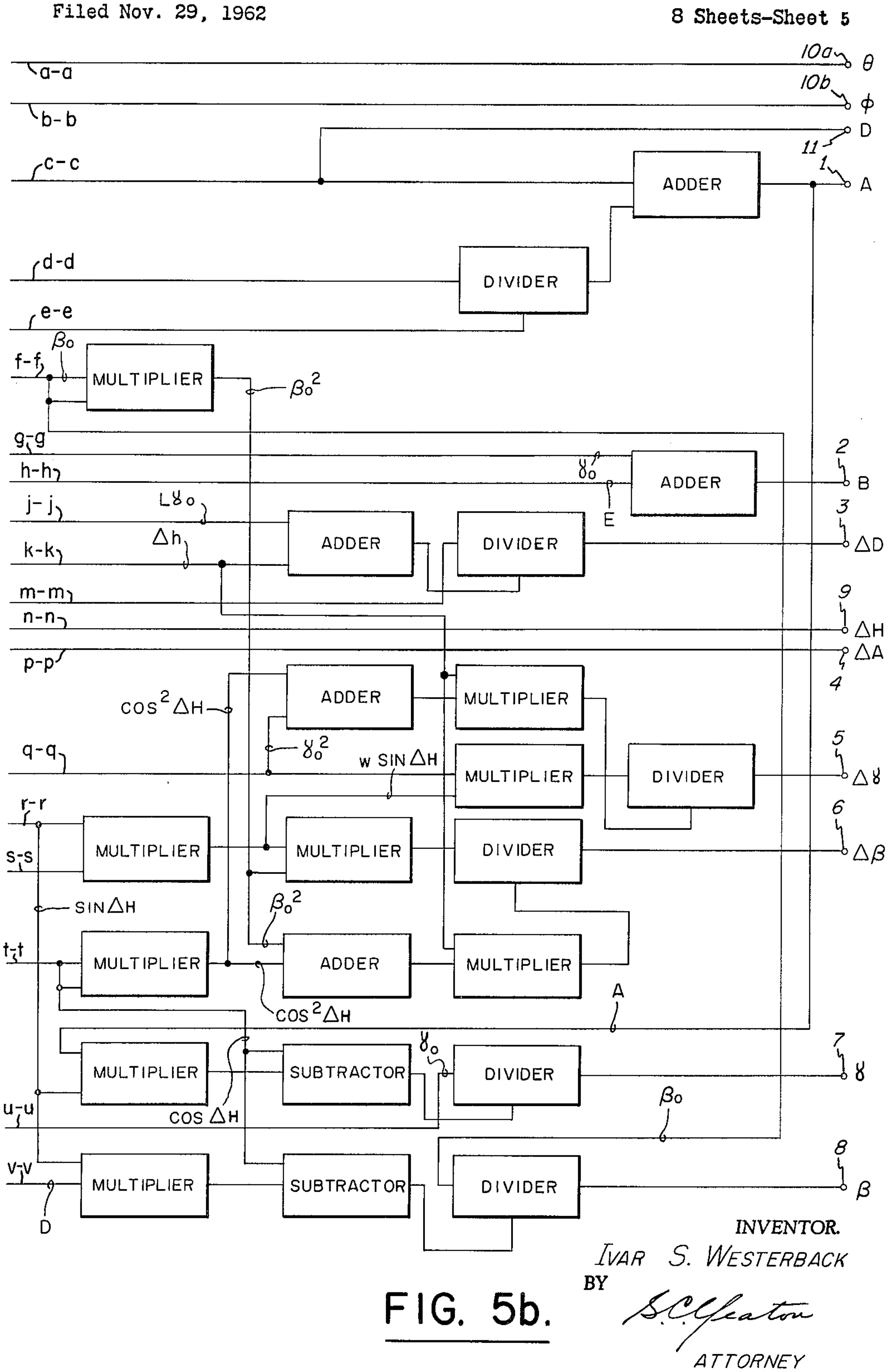
Figures 6, 7, 8:
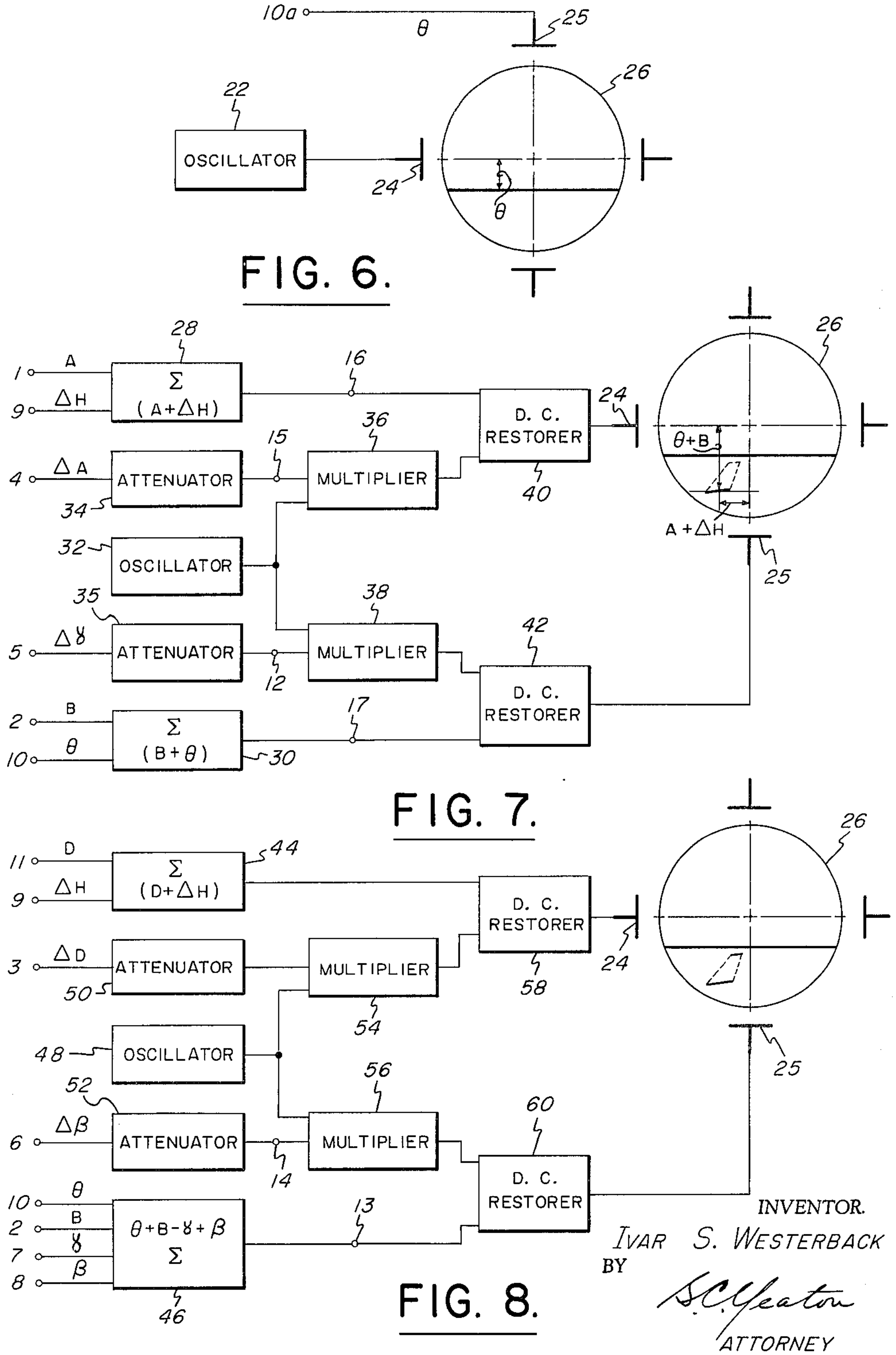
Figures 9, 10:
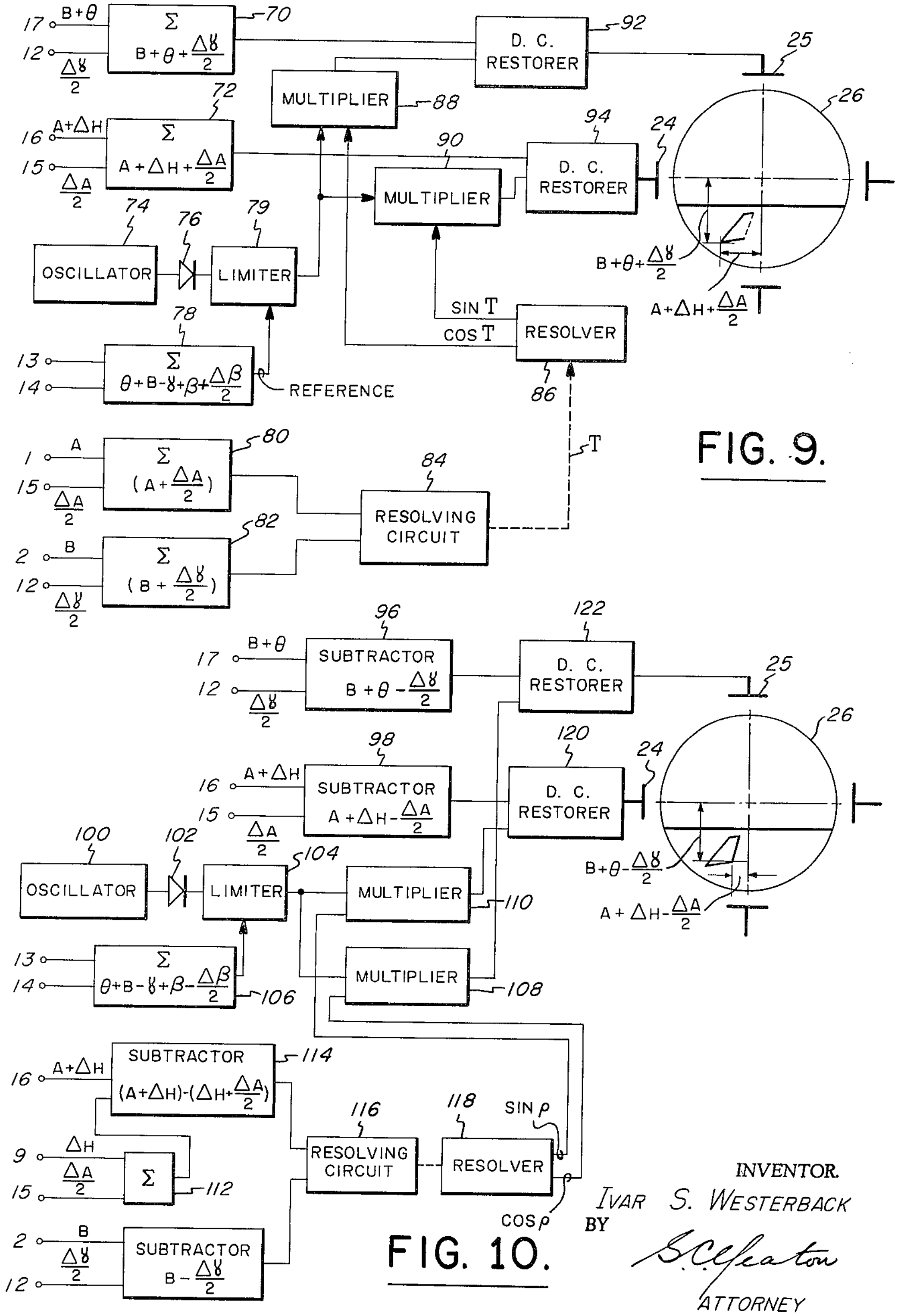
Figure 11:
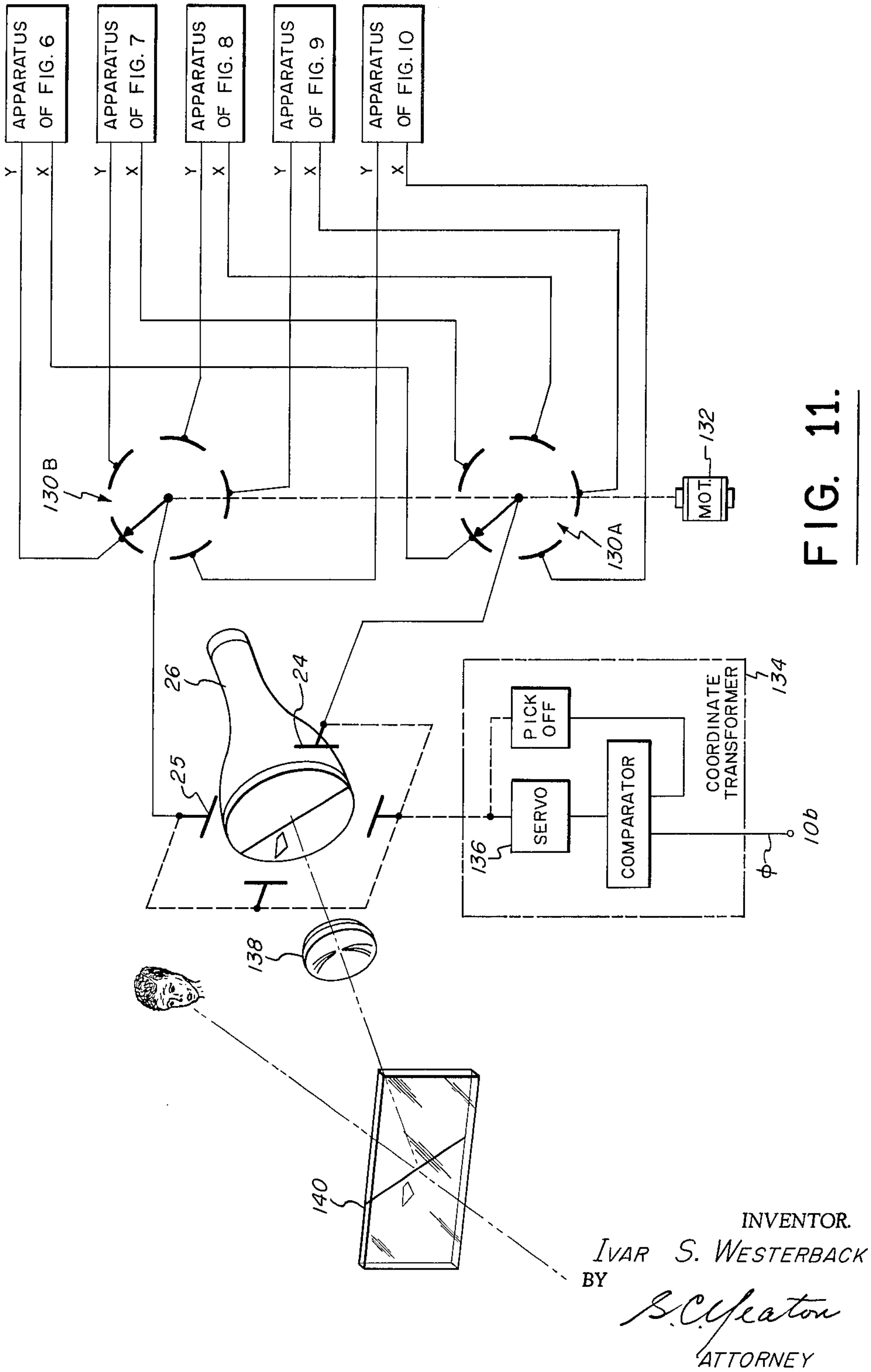

The invention will be described with reference to the figures wherein:

FIGS. 1*a* and 1*b* are diagrams useful in describing the trapezoidal nature of the runway under certain conditions, FIGS. 2*a* and 2*b* are diagrams useful in describing the general quadrangular nature of the runway image, FIGS. 3*a*, 3*b* and 3*c* are diagrams useful in deriving data signals for the generation of a quadrangularly shaped configuration in accordance with the present invention, FIG. 4 shows a real world runway scene as would be viewed by a pilot flying as indicated in FIGS. 3*a* and 3*b*, FIG. 5 is a block diagram showing computing apparatus that operates to provide signals necessary for the generation of the herebefore mentioned quadrangular configuration, FIG. 6 is a block diagram responsive to signals produced by the apparatus of FIG. 5 to produce a figure representing the horizon, FIG. 7 is a block diagram responsive to signals produced by the apparatus of FIG. 5 to produce a figure representing the runway threshold, FIG. 8 is a block diagram responsive to signals produced by the apparatus of FIG. 5 to produce a figure representing the far end of the runway, FIG. 9 is a block diagram responsive to signals produced by the apparatus of FIG. 5 to produce a figure representing one side of the runway, FIG. 10 is a block diagram responsive to signals produced by the apparatus of FIG. 5 to produce a figure representing the other side of the runway, and FIG. 11 is a block diagram showing how the apparatus of FIGS. 5 through 10 may be interconnected to produce a scene like that shown in FIG. 4.

Referring to FIG. 1*a*, a landing craft (flying level) is shown without glide slope and localizer displacements, but crabbed, e.g., as would happen when a cross wind was blowing. As taught in copending application Serial No. 164,769, the runway would appear to the left in the field of view of the pilot in proportion to the relative heading between the heading of the craft and the heading of the runway. In FIG. 1*b* the craft, again without a localizer displacement, flies displaced from the glide slope (in proportion to a signal E) without being crabbed, i.e., there is no cross wind. As is also described in application Serial No. 164,769, such condition causes the runway to appear lengthened and depressed in the pilot field of view. To be noted from FIGS. 1*a* and 1*b* is that so long as the craft has no localizer displacement the runway appears as a trapezoid to the pilot. With the craft displaced from the localizer defined path, however, the runway ceases to appear trapezoidally shaped and assumes instead the general configuration of a lopsided quadrangle. See FIGS. 2*a* and 2*b* for the general appearance of the runway when the craft is respectively right and left of the localizer defined path; in both these figures the corners of the runway are shown appearing at different depressions and lateral displacements within the field of a view of the pilot.

To provide signals representing the amounts that the corners of the runway are depressed and the lateral displacements of such corner points in the field of view of the pilot, the present invention suggests the following descriptive geometry technique: FIGS. 3*a* and 3*b* are drawn depicting a hypothetical situation involving a landing on a runway 20, such runway having a length L and a width W. FIG. 3*a* shows a craft at a point P (with a ground track T) displaced angularly from the "localizer" location F by a displacement D and from the "glide slope" location TD by a displacement A. The craft in FIG. 3*a* is also shown having a heading $\Delta$ H relative to the runway heading. FIG. 3*b* shows in profile the view of FIG. 3*a* and indicates that the craft has a pitch attitude $\theta$, is at an altitude $\Delta h$, and is on the glide slope (which makes the angle $\gamma_0$ with the earth); in addition, FIG. 3*b* indicates that the pilot, to see the point F, must look along a line that intersects the earth at an angle $\beta_0$. In looking left and right to bring the threshold corner points $TD_1$ and $TD_2$ into coincidence with his line of sight, the pilot must move such sight line through the angle ΔA; similarly, the points $F_1$ and $F_2$ are angularly displaced by the angle ΔD. In up-down scanning, FIG. 3*b* shows that the pilot must depress his line of sight more for the point TD than for the point F. Since the field of view seen by a pilot in a craft flying as indicated in FIGS. 3*a* and 3*b* has its axis in the plane of the ground track T which is perpendicular to the surface of the earth, projection of the points of FIG. 3*a* onto a plane X—X parallel to such ground track plane is suggested, e.g. the point P of FIG. 3*a* projects to point P' of FIG. 3*c*, to determine how much the pilot must depress his line of sight for the different runway corner points. On FIG. 3*c*, "prime" notations are used to indicate respective variables on FIG. 3*a*; to be observed from FIG. 3*c* also is that $\gamma$ and $\beta$ (not $\gamma_0$ and $\beta_0$) are the respective depression angles for the runway points TD' and F' when the craft has a localizer displacement.

From FIGS. 3*a*, 3*b* and 3*c*, the following identities may be trigonometrically derived:

$$\tan A=\left(\frac{1+L\tan\gamma_0}{\Delta h}\right)\tan D \quad (1)$$

$$\tan\Delta A=\frac{w\tan\gamma_0}{\Delta h}\cos^2 A \quad (2)$$

$$\tan\Delta D=\frac{w\cos^2 D\tan\gamma_0}{\Delta h+L\tan\gamma_0} \quad (3)$$

$$\tan\beta_0=\frac{\Delta h\tan\gamma_0}{\Delta h+L\tan\gamma_0} \quad (4)$$

$$\tan\Delta\gamma=\frac{w}{\Delta h}\,\frac{\sin\Delta H\tan^2\gamma_0}{\tan^2\gamma_0+\cos^2\Delta H} \quad (5)$$

$$\tan\Delta\beta=\frac{w}{\Delta h}\,\frac{\sin\Delta H\tan^2\beta_0}{\tan^2\beta_0+\cos^2\Delta H} \quad (6)$$

$$\tan\gamma=\frac{\tan\gamma_0}{\cos\Delta H-\tan A\sin\Delta H} \quad (7)$$

$$\tan\beta=\frac{\tan\beta_0}{\cos\Delta H-\tan D\sin\Delta H} \quad (8)$$

where Δ H, D, *w*, L, $\gamma_0$, $\Delta h$, and E are data signals normally available within an aircraft. Assuming small angles (except for ΔH which may be large) these expressions may (for simplicity) be reduced to:

$$A=\left(1+\frac{L\gamma_0}{\Delta h}\right)D \quad (9)$$

$$\Delta A=\frac{w\gamma_0}{\Delta h} \quad (10)$$

$$\Delta D=\frac{w\gamma_0}{\Delta h+L\gamma_0} \quad (11)$$

$$\beta_0=\frac{\Delta h\gamma_0}{\Delta h+L\gamma_0} \quad (12)$$

$$\Delta\gamma=\frac{w\sin\Delta H\gamma_0^2}{\Delta h(\gamma_0^2+\cos^2\Delta H)} \quad (13)$$

$$\Delta\beta=\frac{w\sin\Delta H\beta_0^2}{\Delta h(\beta_0^2+\cos^2\Delta H)} \quad (14)$$

$$\gamma=\frac{\gamma_0}{\cos\Delta H-A\sin\Delta H} \quad (15)$$

$$\beta=\frac{\beta_0}{\cos\Delta H-D\sin\Delta H} \quad (16)$$

Referring to FIG. 4, the runway 20 is shown as it would appear to the pilot of the craft in the hypothetical situation of FIGS. 3*a* and 3*b* (assuming the craft is also banked to the left); in addition, FIG. 4 indicates various dimensions which are related, as will be presently described, to the dimensions indicated on FIGS. 3*a*, 3*b* and 3*c*. With such interrelationship appreciated, computation of the aforementioned equations to provide signals useful in reproducing the scene of FIG. 4 will become apparent. Examining then FIGS. 3*a*, 3*b*, 3*c* and 4 simultaneously, it is seen that the runway corner $TD_1$ is depressed within the field of view more than the runway corner $TD_2$, that the horizontal component in the view of the runway threshold is proportional to the angle ΔA, that the vertical component of the threshold in such view is proportional to the angle $\Delta\gamma$, etc. From FIG. 4 it is further seen that craft roll $\phi$, craft pitch $\theta$, glide slope and glide slope displacement B, and localizer displacement D are position variables useful in the same manner as is described in copending application Serial No. 164,769, with the following minor refinements: (1) B here represents the $\gamma+E$, and not $\gamma_0+E$, because $\gamma_0$ has (by virtue of the FIG. 3 projection) an apparent value to the pilot of $\gamma$ when there is a localizer displacement. (2) Because in the present situation consideration is given to the actual location of the localizer ground based equipment, the variable A must be used instead of the variable D as a measure of the lateral displacement of the center of the threshold in the pilot field of view.

Referring to FIG. 5, computation to produce D.C. signals representing the variables A, ΔA, ΔD, $\gamma$, $\Delta\gamma$, $\beta$, $\Delta\beta$, and B (from the available data signals ΔH, D, *w*, L, $\gamma_0$, $\Delta h$, and E) in accordance with Equations 8 to 16 is provided in a straight-forward manner by means of well-known computing blocks.

To show how the scene of FIG. 4 can be reproduced locally, successive circuits (responsive to signals produced by the apparatus of FIG. 5) are developed for producing on a cathode ray tube the different lines in the scene; these line producing circuits are then combined in a time-sharing arrangement to produce the complete scene.

"HORIZON LINE" CIRCUIT

Referring to FIG. 6 an oscillator 22 applies its output signal to the horizontal deflection plates 24 of a cathode ray tube 26 to cause the electron beam of the tube to sweep horizontally across the tube face. Applied to the vertical deflection plates 25 of the tube is a signal $\theta$ representing the craft pitch attitude and produced by the apparatus of FIG. 5. The signal $\theta$ (a bias signal) causes the trace on the tube face to move up and down in proportion to the craft pitch attitude in the same manner that the horizon moves in the pilot field of view when he noses his craft up and down.

"THRESHOLD LINE" CIRCUIT

To trace a line on the face of the tube 26 which changes size and direction in the same manner that a real world runway threshold apparently changes in the field of view of a pilot, a quiescent position TD (the center of the runway threshold) is located on the tube face; then the electron beam of the tube is caused to sweep relative to this position, thereby creating a trace. Referring to FIG. 7 (and the dimensions on FIG. 4) the point TD on the tube face is located by summing the signals A and ΔH in a summing device 28 and applying such sum signal to the tube 26 horizontal deflection plates 24; similarly, the signals B and $\theta$ are summed in a summing device 30, the sum signal of which is applied to the vertical deflection plates 25. Since the threshold is skewed, i.e. when there is a localizer displacement, the sweep voltage produced by an oscillator 32 is 1: applied simultaneously to both the horizontal and the vertical deflection plates of the tube 26 (however in 0° or 180° phase relationship so that by Lizzajou techniques the tube electron beam always sweeps linearly), and 2: varied in amplitude directly as functions of $\Delta A/2$ and $\Delta\gamma/2$ before being applied respectively to the tube horizontal and vertical deflection plates. (With no skewing $\Delta\gamma/2=O$; therefore sweep signals at this time are applied only to the horizontal deflection plates.) To vary the oscillator output signals so, they are applied to multipliers 36 and 38 which receive as multiplier signals the signals $\Delta A/2$ and $\Delta\gamma/2$ respectively from attenuators 34 and 35, such attenuators operating to attenuate their respective ΔA and Δγ input signals by 50 percent. D.C. restorers 40 and 42 are respectively provided for the horizontal and vertical deflection plates 24 and 25 to combine their respective A.C. oscillator sweep signals with their D.C. positioning bias signals (a known technque).

"FAR-END LINE" CIRCUIT

Referring to FIG. 8, a line representing the far end of the runway is traced in substantially the same way that the "threshold" line is traced. That is, the point F is horizontally located on the tube face by summing the signals D and ΔH in a summing device 44 and applying such sum signal as a beam deflecting bias to the horizontal deflection plates 24 of the tube 26. To locate vertically the position of the point F, the signal $\theta$ is added to the signal $B-\gamma+\beta$ in a summing device 46 to produce a bias sum signal for application to the tube vertical deflection plates 25. Since the far end of the runway (like the runway threshold) is skewed, an oscillator 48 has its sweep output signals applied simultaneously to the tube horizontal and vertical deflection plates, such signals being varied respectively as functions of $\Delta D/2$ and $\Delta\beta/2$. To provide the signals $\Delta D/2$ and $\Delta\beta/2$, the signals ΔD and Δβ are applied to respective attenuating devices 50 and 52 which operate to halve their input signals; multiplying devices 54 and 56 then vary the oscillator sweep signal amplitudes as functions of $\Delta D/2$ and $\Delta\beta/2$. As above, respective D.C. restorers 58 and 60 then combine the sweep and positioning bias signals for application to the horizontal and vertical deflection plates.

"LINE $TD_1$–$F_1$" CIRCUIT

To trace the line $TD_1$–$F_1$ on the face of the tube 26, the point $TD_1$ is located and used as a quiescent position from which a rectified sine wave signal creates a trace in a generally vertical direction on the tube face. Referring to FIG. 9 (and the dimensions on FIG. 4), a summing device 70, receiving the signals $B+\theta$ and $\Delta\gamma/2$ from points 12 and 17 of FIG. 7 respectively, has its output sum signal applied to the vertical deflection plates 25 to locate on the tube the quiescent vertical displacement for the trace producing rectified sine wave signal. Similarly, the horizontal quiescent displacement for the sine wave signal is determined by applying the signals $A+\Delta H$ and $\Delta A/2$ from points 15 and 16 of FIG. 7 to a summing device 72 and applying the output sum signal thereof to the tube horizontal deflection plates 24.

For the trace, an oscillator 74 (preferably capable of so deflecting the tube electron beam that it produces a trace across the whole face of the tube) produces a sine wave signal which is rectified by a rectifier 76 to assure that only its positive-going half cycles are applied to the tube deflection plates, thereby guaranteeing that the trace producing beam always gets deflected upward and away from the point $TD_1$ on the tube face. To assure that the beam never gets deflected vertically above the point $F_1$ on the tube face, a limiter 79 is provided which so limits the rectifier output signal as to prevent it from deflecting the tube electron beam upwardly from point $TD_1$ past the point $F_1$, this limiting point being at a distance, measured from the tube axis, equal to $$\theta+B-\gamma+\beta+\Delta\beta/2$$

a signal proportional to this distance being produced by an algebraic sum circuit 78 and applied to the limiter 79 as a reference signal.

Since, from FIG. 4, the line $TD_1$–$F_1$ is skewed through an angle $\tau$, the limited rectified sine wave signal is applied to both the tube vertical and horizontal deflection plates (in 0° or 180° phase relationships for tracing straight lines according to Lizzajou techniques) and varied in amplitude respectively as functions of cos $\tau$ and sin $\tau$. Therefore, when there is no skewing of the line $TD_1$–$F_1$ i.e. the craft has no localizer displacement, sin $\tau=0$ and no signal is applied to the horizontal deflection plates. To produce the signals sin $\tau$ and cos $\tau$, signals $A+\Delta A/2$ and $B+\Delta\gamma/2$ are applied by respective summing devices 80 and 82 to a resolving circuit 84, e.g. the circuit of FIG. 7 in copending application Serial No. 164,769. This circuit produces a rotation of its output shaft proportional to the angle $\tau$; by connecting such shaft to drive the rotor of a sine—cosine resolver 86, the signals cos $\tau$ and sin $\tau$ are produced. These signals are then applied respectively to multiplying devices 88 and 90 which cosinusoidally and sinusoidally vary their rectified sine wave input signals for the purpose indicated above. To combine the D.C. locating and the A.C. sweep signals, D.C. restorers 92 and 94 are provided, as above, for the vertical and horizontal tube deflection plates respectively.

"LINE $TD_2$–$F_2$" CIRCUIT

The line $TD_2$–$F_2$ is traced on the face of the tube 26 in the same manner that the line $TD_1$–$F_1$ is traced, i.e. the point $TD_2$ is located and used as a quiescent position from which a rectified sine wave signal creates a trace in a generally vertical direction on the tube face. Referring to FIG. 10, a subtraction device 96 receiving the signals $B+\theta$ and $\Delta\gamma/2$ from points 12 and 17 of FIG. 7 respectively, has its output signal applied to the vertical deflection plates 25 to locate on the tube face the quiescent vertical displacement for the trace producing rectified sine wave signal. Similarly, the horizontal quiescent displacement for the sine wave signal is determined by applying the signals $A+\Delta H$ and $\Delta A/2$ from points 15 and 16 of FIG. 7 to a subtraction device 98 and applying the output difference signal thereof to the tube horizontal deflection plates 24.

For the trace, an oscillator 100 produces a sine wave signal which is rectified by a rectifier 102 to assure that only positive going half cycles are applied to the deflection plates, thereby assuring a trace which never goes below the point $TD_2$ on the tube face. To assure that the trace never goes above the point $F_2$ on the tube face, a limiter 104 is provided which so limits the rectifier 102 output signal as to prevent it from deflecting the tube electron beam beyond this point which is defined by the expression $\theta+B-\gamma+\beta-\Delta\beta/2$, signal proportional to this distance being produced by an algebraic summing device 106 and applied to the limiter 104 as a reference signal.

Like line $TD_1$–$F_1$, line $TD_2$–$F_2$ is skewed, however through an angle $\rho$. Because of this, the limited rectified sine wave signal appearing at the output of the limiter 104 is applied simultaneously to the tube vertical and horizontal deflection plates as above and varied respectively as functions of cos $\rho$ and sin $\rho$ by multipliers 108 and 110. Sin $\rho$ and cos $\rho$ are produced by subtracting (in a subtracting device 114) a signal $\Delta H+\Delta A/2$ (produced by a summing device 112) from a signal $A+\Delta H$ appearing at point 16 (FIG. 7); such difference signal is then applied to a resolving circuit 116 (like the circuit 84 above). The resolving circuit 116 which also receives a signal $B-\Delta\gamma/2$ produces a mechanical shaft rotation representative of the angle $\rho$. As before, this rotational shaft displacement is converted to sin $\rho$ and cos $\rho$ signals by a resolver 118. D.C. restores 120 and 122 then operate as above to combine the A.C. and D.C. signal components for the horizontal and vertical deflection plates respectively.

TIME SHARING CIRCUIT

Referring to FIG. 11, the horizontal (X) deflection signals of the circuits of FIGS. 6 through 10 are shown being applied through a commutating switch 130A to the plates 24; in like manner, the vertical (Y) deflection signals of the FIGS. 6 through 10 circuits are applied through a commutating switch 130B to the plates 25. Switches 130A and 130B are ganged so that only respective deflection signals from one circuit are applied to the tube deflection plates at a given time, the wipers of such switches being driven by a motor 132. The motor 132 is adapted to run at a frequency substantially less than the frequencies at which the oscillators of FIGS. 6 through 10 operate, this being to assure that a plurality of trace producing sweeps are made for each line while the switch wipers are at respective switch positions. Since the scene viewed by the pilot rotates as a function of the craft roll attitude $\phi$, a coordinate transformer 134 is provided to provide rotation of the tube 26 deflection plates about the axis of the tube, thereby rotating the locally produced scene in the same manner that the pilot's view rotates. In this form of the invention the coordinate transformer comprises a position servo 136 (with suitable pick-off and comparison components) adapted to rotate the tube 26 about its longitudinal axis in proportion to the signal $\phi$. If preferred, however, coordinate transformation may be provided electrically, e.g. by the apparatus shown on page 331. Electronic Analogue Computers, Korn and Korn, McGraw-Hill Book Company, Inc., New York, 1956. A collimating lens 138 takes the configuration appearing on the face of the tube 26 and directs it to a combining glass 140 adapted to be oriented so that a pilot can look through it to see the real world. The combining glass 140 may be a sheet of transparent reflective material tilted to assure that the light from the face of the tube 26 reflects to the eye of the pilot thereby providing, as is taught in copending application Serial No. 164,769, an image overlay for the real world runway image.

Obviously many modifications may be made to the aforedescribed apparatus. For example, tube deflection coils may be used instead of tube deflection plates; different components in the different circuits of FIGS. 6 through 10 may be time shared; instead of using location $TD_1$ as a quiescent location for the generation of the line $TD_1$–$F_1$, $F_1$ can be used as the quiescent location; likewise $TD_1$ can be used instead of TD as a quiescent location for the threshold; the oscillators used in the individual circuits need not be sine wave oscillators but may produce pulses, sawtooth waves, etc.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for creating a quadrangular configuration representative of the image of the runway seen by a pilot while landing an aircraft comprising means for producing a linear figure representative of the threshold of said runway, means for producing a linear figure representative of the far end of said runway, means for producing a first linear side line figure and means producing a second linear side line figure representing respectively first and second runway sides, combining means for said figures producing a quadrangular configuration, means providing a background for said quadrangular configuration, means for moving said configuration left and right relative to said background when said craft respectively is displaced angularly to the right and left of the center of the runway, and means operable with said combining means to increase the angle between the threshold representative figure and said first side line figure while decreasing the angle between said threshold representative figure and the other side line figure when the craft is closer to the first runway side line than to the second runway side line, said last-named means being also operable to increase the angle between the threshold representative figure and said second side line figure while decreasing the angle between said threshold representative figure and the first side line figure when the craft is closer to the second runway side line than to the first runway side line, said last-named means further being operable to change the orientation of said threshold representative figure, whereby the length of said first side line figure is decreased and the length of said second side line figure is increased when the craft is closer to said first runway side line than to said second runway side line, and the length of said second side line figure is decreased and the length of said first side line figure is increased when the craft is closer to the second runway side line than to the first runway side line.

2. The apparatus of claim 1 wherein said combining means includes means operable with said combing means for increasing the size of said quadrangular configuration when said craft moves near the run threshold, said means also decreasing the configuration size when said craft moves away from the runway threshold.

3. Apparatus for producing a runway image having a configuration corresponding to the configuration of the real runway as would be seen by a pilot during a landing maneuver of the aircraft comprising cathode ray tube means, means for deflecting the electron beam of said tube means in orthogonal directions, means for producing first signals for application to said beam deflecting means capable of deflecting said beam to locate a first quiescent position on said tube means face, said position representing the location of a point on the threshold of said runway, means for producing second signals for application to said beam deflecting means capable of deflecting said beam to locate a second quiescent position on said tube means face representing the location of a point on the far end of said runway, and means for producing sweep signals for application to said beam deflecting means to create a trace on said tube face that joins both said quiescent positions.

4. The apparatus of claim 3 including means for optically directing the figure on the face of said cathode ray tube means into the field of view of the craft pilot to appear as an overlay for the image seen by said pilot of the actual runway.

5. The apparatus of claim 3 including means for producing third signals for application to said beam deflecting means capable of deflecting said beam to locate a third quiescent position on said tube means face representing a second point on the threshold of said runway, means for producing fourth signals for applicatioin to said beam deflecting means capable of deflecting said beam to locate a fourth quiescent position on said tube means face representing a second point on the far end of said runway, and means for producing sweep signals for application to said beam deflecting means to create a trace between said third and fourth quiescent positions.

6. The apparatus of claim 5 including means for increasing and decreasing the magnitudes of all said traces as a function of the distance of the craft from the runway.

7. Apparatus for producing a runway image having a configuration corresponding to the configuration of an actual runway as would be seen by a pilot during a landing maneuver of an aircraft comprising cathode ray tube means, means for deflecting the electron beam of said tube means in orthogonal directions, means for producing first signals for application to said beam deflecting means capable of deflecting said beam to locate a first quiescent position on said tube means face, said position representing a first side of the threshold of said runway, means for producing second signals for application to said beam deflecting means capable of deflecting said beam to locate a second quiescent position on said tube means face representing the other or second side of said runway threshold, means for producing sweep signals for application to said beam deflecting means to create a trace on said tube face that joins both said quiescent positions, and means for decreasing and increasing the amounts said first and second quiescent positions are from the center of said tube means face when said craft is closer to the first threshold side than to said second threshold side, and means for decreasing and increasing the amounts said second and first quiescent positions are from the center of said tube means face when said craft is closer to the second threshold side than to said first threshold side.

8. The apparatus of claim 7 including means for producing third signals for application to said beam deflecting means capable of deflecting said beam to locate a third quiescent position on said tube means face representing one side of the far end of said runway, means for producing fourth signals for application to said beam deflecting means capable of deflecting said beam to locate a fourth quiescent position on said tube means face representing the other side of the far end of the runway, and means for producing sweep signals for application to said beam deflecting means to create traces between said first and third quiescent positions, said third and fourth quiescent positions and said second and fourth quiescent positions.

9. The apparatus of claim 7 including means for varying the magnitudes of all said traces in inverse proportion to the distance from said aircraft to said runway.

10. The apparatus of claim 7 including means for optically collimating and directing said runway image on the face of said cathode ray tube means into the field of view of the pilot whereby said runway image appears to overlay the actual runway.

11. Apparatus for aircraft for simulating a runway scene viewed by the pilot of the aircraft during an approach to said runway comprising cathode ray tube means having means for deflecting its beam about orthogonal axes, means for use in producing a first trace on said cathode ray tube means face representing the threshold of said runway, means for producing a second trace on said cathode ray tube means face representing the far end of said runway, means positioning said first trace on said tube means face in proportion to the angle that the line of sight of said pilot makes to said runway threshold with respect to a reference line, and means positioning said second trace on said tube means face in proportion to the angle that the pilot line of sight makes to the far end of said runway with respect to said reference line, said means for positioning said first trace including means for producing a glide slope signal proportional to the angle that a radio defined course makes with the ground, radio receiving means for producing a signal proportional to craft vertical departures from that radio defined course, means for algebraically summing said signals to produce a first bias signal, said first bias signal being applied at a first time to said beam deflecting means to deflect said beam about a first of its axes, said means for positioning said second trace including means for producing a signal proportional to the length of said runway, and means for producing as a second bias signal a signal proportional to the difference between said first bias signal and said runway length signal, said second bias signal being applied at a second time to said beam deflecting means to deflect said beam about said first axis.

12. Apparatus of claim 11 including means for producing traces on said tube means face that connect substantially opposing ends of said first and second traces, whereby a quadrangular configuration is produced on the tube means face.

13. Apparatus for aircraft for simulating a runway scene that would be viewed by the pilot of an aircraft approaching said runway comprising cathode ray tube means having means deflecting its beam about orthogonal axes, means for use in producing a first trace on said cathode ray tube means face representing the threshold of said runway, means for use in producing a second trace on said cathode ray tube means face representing the far end of said runway, means for positioning said first trace on said tube means face in proportion to the angle that the line of sight of said pilot makes to said runway threshold with respect to a reference line, and means for positioning said second trace on said tube means face in proportion to the angle that the pilot line of sight makes to the far end of said runway with respect to said reference line, said apparatus including means for angularly rotating the first and second traces on said tube means face in proportion to the misalignment of the craft with the centerline of said runway.

14. Apparatus for simulating a runway scene as would be seen by a pilot of an aircraft approaching said runway comprising cathode ray tube means, means for producing a first trace on said cathode ray tube means face representing the threshold of said runway, means for producing a second trace on said cathode ray tube means face representing the far end of said runway, means downwardly positioning said first trace on said tube means face in proportion to the angle that the line of sight of said pilot makes to said runway threshold with respect to a reference line, means downwardly positioning said second trace on said tube means face in proportion to the angle that the pilot line of sight makes the far end of said runway with respect to said reference line, means for producing third and fourth traces on said tube means face connecting opposing ends of said first and second traces, whereby a quadrangular configuration is produced on the tube means face, means for laterally moving said first and second traces with respect to each other in proportion to the misalignment of the craft with the runway centerline, and means for angularly moving said third and fourth traces relative to said first and second traces in accordance with said lateral movement of said first and second traces whereby to maintain said quadrangular configuration.

15. The apparatus of claim 14 including means for optically collimating and directing the figure on the face of said cathode ray tube means into the field of view of the craft pilot whereby said figure appears as an overlay on the real runway when the latter is seen by said pilot.

16. The apparatus of claim 11 including radio means for producing a third bias signal proportional to lateral departures of said craft from said defined course, means for applying said last named signal to said beam deflecting means at said second time to deflect said beam about a second of its axes, means for varying the magnitude of said third bias signal in proportion to said runway length signal to produce a fourth bias signal, and means for applying said fourth bias signal to said beam deflecting means at said first time to deflect said beam about the second of its axes.

17. The apparatus of claim 16 wherein said means for varying the magnitude of said third bias signal includes means for producing a signal proportional to craft altitude above said runway, and wherein said signal varying means is a computer adapted to compute an expression which is the equivalent of $A=L\gamma_0 D/\Delta h+D$, where A, L, $\gamma_0$, D and $\Delta h$ represent respectively the fourth bias signal, the runway length signal, the glide slope signal, the third bias signal and said altitude signal.

18. Apparatus for aircraft for use in conjunction with instrument landing systems for deriving a bias signal for locating a quiescent point on the face of a cathode ray tube which point is representative of the center of the threshold of a runway comprising radio means for producing a first signal representative of craft lateral displacement from a radio defined course, means for producing a second signal representative of craft altitude with respect to said runway, means for producing a third signal representative of the vertical angle between said radio defined course and the horizontal, means for producing a fourth signal proportional to the length of said runway, and computing means for receiving all said signals for computing therewith an expression which is the equivalent of $A=L\gamma_0 D/\Delta h+D$, where A, D, $\Delta h$, $\gamma_0$ and L represent respectively said bias signal and said first, second third and fourth signals.

References Cited by the Examiner

UNITED STATES PATENTS

| | | | |
|---|---|---|---|
| 2,967,263 | 1/1961 | Steinhauser | 343—108 X |
| 2,988,821 | 6/1961 | Bolie | 35—10.4 |
| 3,081,557 | 3/1963 | Mailhot | 35—10.4 |
| 3,093,822 | 6/1963 | Balding | 343—108 X |

CHESTER L. JUSTUS, *Primary Examiner.*